US012763368B2

(12) United States Patent
Liu et al.

(10) Patent No.: US 12,763,368 B2
(45) Date of Patent: Oct. 13, 2026

(54) ELECTROCHEMICAL DEVICE AND ELECTRONIC DEVICE CONTAINING SAME

(71) Applicant: Ningde Amperex Technology Limited, Ningde (CN)

(72) Inventors: Junfei Liu, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 563 days.

(21) Appl. No.: 18/374,786

(22) Filed: Sep. 29, 2023

(65) Prior Publication Data

US 2024/0047749 A1 Feb. 8, 2024

Related U.S. Application Data

(63) Continuation of application No. PCT/CN2021/084482, filed on Mar. 31, 2021.

(51) Int. Cl.
*H01M 10/0567* (2010.01)
*H01M 4/02* (2006.01)
(Continued)

(52) U.S. Cl.
CPC ... *H01M 10/0567* (2013.01); *H01M 10/0525* (2013.01); *H01M 10/0568* (2013.01); *H01M 2004/021* (2013.01); *H01M 2004/027* (2013.01); *H01M 4/0404* (2013.01); *H01M 4/133* (2013.01); *H01M 4/134* (2013.01)

(58) Field of Classification Search
CPC ...................... H01M 10/0567; H01M 10/4235
See application file for complete search history.

(56) References Cited

U.S. PATENT DOCUMENTS 9,263,726 B2 2/2016 Seo
9,947,965 B2 4/2018 Nakazawa et al.
(Continued)

FOREIGN PATENT DOCUMENTS

CN 203377334 U 1/2014
CN 107732300 A 2/2018
(Continued)

OTHER PUBLICATIONS

Yang et al.; "Improving the cyclability performance of lithium-ion batteries by introducing lithium difluorophosphate (LiPO2F2) additive"; RSC Adv. 2017, 7, pp. 26052-26059. (Year: 2017).*
(Continued)

*Primary Examiner* — Gregg Cantelmo
(74) *Attorney, Agent, or Firm* — XSENSUS LLP

(57) ABSTRACT

An electrochemical device includes a negative electrode and an electrolytic solution. The negative electrode includes a negative current collector and a negative active material layer disposed on at least one surface of the negative current collector. The negative active material layer includes a first region and a second region. A thickness of any position of the first region is less than an average thickness of the second region. The electrolytic solution includes a salt containing a P—O bond, and the salt accounts for a given content. The electrochemical device according to this application achieves excellent cycle performance.

20 Claims, 1 Drawing Sheet

(51) Int. Cl.

| | |
|---|---|
| ***H01M 4/04*** | (2006.01) |
| ***H01M 4/133*** | (2010.01) |
| ***H01M 4/134*** | (2010.01) |
| ***H01M 10/0525*** | (2010.01) |
| ***H01M 10/0568*** | (2010.01) |

(56) References Cited

U.S. PATENT DOCUMENTS

| | | | | |
|---|---|---|---|---|
| 10,263,293 | B2 * | 4/2019 | Yu | H01M 10/0569 |
| 11,139,507 | B2 | 10/2021 | Lim et al. | |
| 11,322,780 | B2 | 5/2022 | Sakata et al. | |
| 12,183,888 | B2 | 12/2024 | Lee et al. | |
| 2011/0129701 | A1 | 6/2011 | Seo | |
| 2013/0236771 | A1 * | 9/2013 | Jeong | H01M 4/043 29/623.5 |
| 2014/0045021 | A1 | 2/2014 | Okutani et al. | |
| 2014/0045035 | A1 * | 2/2014 | Yoshida | H01M 10/0567 429/188 |
| 2016/0013517 | A1 | 1/2016 | Nakazawa et al. | |
| 2019/0288339 | A1 | 9/2019 | Sakata et al. | |
| 2019/0356021 | A1 | 11/2019 | Lim et al. | |
| 2020/0313176 | A1 * | 10/2020 | Wang | H01M 4/133 |
| 2022/0166069 | A1 | 5/2022 | Lee et al. | |

FOREIGN PATENT DOCUMENTS

| | | | |
|---|---|---|---|
| CN | 109088091 | A | 12/2018 |
| CN | 109980177 | A | 7/2019 |
| CN | 110010902 | A | 7/2019 |
| CN | 110148784 | A | 8/2019 |
| CN | 110444810 | A | 11/2019 |
| CN | 107799822 | B | 2/2020 |
| CN | 110870121 | A | 3/2020 |
| CN | 111129592 | A | 5/2020 |
| CN | 111628219 | A | 9/2020 |
| CN | 111786020 | A | 10/2020 |
| CN | 112216862 | A | 1/2021 |
| JP | 2011119216 | A | 6/2011 |
| JP | 2014035939 | A | 2/2014 |
| JP | 2018125313 | A | 8/2018 |
| KR | 20170110995 | A | 10/2017 |
| KR | 20170111721 | A | 10/2017 |
| KR | 20180106971 | A | 10/2018 |
| KR | 20190057925 | A | 5/2019 |
| KR | 20190092879 | A | 8/2019 |
| KR | 20200112732 | A | 10/2020 |
| WO | 2018016246 | A1 | 1/2018 |

OTHER PUBLICATIONS

International Search Report and Written Opinion mailed on Dec. 15, 2021, received for PCT Application PCT/CN2021/084482, filed on Mar. 31, 2021, 10 pages including English Translation.

The First Office Action mailed Mar. 8, 2024, in Chinese Application No. 202180004206.X, 15 pages including English translation.

Supplementary European Search Report mailed Mar. 11, 2025, in European Application No. 21933770.6, 7 pages.

Notice of Reasons for Refusal mailed Nov. 5, 2024, in Japanese Application No. 2023-555401, 14 pages including English translation.

Request for the submission of an opinion mailed Apr. 14, 2025, in Korean Application No. 10-2023-7026931, 19 pages including English translation.

Notice of Allowance mailed Nov. 11, 2025, in Korean Application No. 10-2023-7026931, 4 pages including English translation.

* cited by examiner

ELECTROCHEMICAL DEVICE AND ELECTRONIC DEVICE CONTAINING SAME

CROSS-REFERENCE TO RELATED APPLICATION

This application is a continuation application of International Application No. PCT/CN2021/084482, filed on Mar. 31, 2021, the contents of which are incorporated herein by reference in its entirety.

TECHNICAL FIELD

This application relates to the technical field of energy storage, and in particular, to an electrochemical device and an electronic device containing same, and especially, to a lithium-ion battery.

BACKGROUND

Electrochemical devices (such as a lithium-ion battery) have been widely applied in the fields and industries such as smart products (including electronic devices such as a mobile phone, a notebook computer, and a camera), electric vehicles, electrical tools, unmanned aerial vehicles, smart robots, and large-scale energy storage due to advantages such as a high energy density, a high working voltage, a light weight, a low self-discharge rate, a long cycle life, no memory effect, and environmental friendliness. However, with the rapid progress of information and communications technologies and the diversification of market demand, people have posed higher requirements and more challenges on the power supply of the electronic products. For example, the power supply is expected to be thinner, lighter, and more diverse in appearance and to achieve a higher volumetric energy density and mass energy density, greater safety and higher power, and the like.

During the manufacture of an electrochemical device, an active material layer is formed on the surface of a current collector usually by coating. However, limited by a production process, such a coating manner inevitably brings a problem of thinned edges, and brings an adverse effect on the performance, especially the cycle performance, of the electrochemical device.

In view of this, it is necessary to provide an electrochemical device of improved performance and an electronic device containing same.

SUMMARY

An embodiment of this application provides an electrochemical device and an electronic device containing same in an attempt to solve at least one problem in the related art to at least some extent.

In an embodiment, this application provides an electrochemical device. The electrochemical device includes a negative electrode and an electrolytic solution. The negative electrode includes a negative current collector and a negative active material layer disposed on at least one surface of the negative current collector. The negative active material layer includes a first region and a second region. A thickness D1 of the first region is less than an average thickness D2 of the second region. The electrolytic solution includes a salt containing a P—O bond. A content of the salt containing a P—O bond is less than or equal to 0.05 gram per 1 $cm^2$ of the first region.

According to an embodiment of this application, D1 and D2 satisfy: $0<D1\leq D2\times 97\%$.

According to an embodiment of this application, the salt containing a P—O bond includes at least one of $LiPO_2F_2$, $NaPO_2F_2$, $KPO_2F_2$, $CsPO_2F_2$, lithium difluorobisoxalate phosphate (LiDFOP), or lithium tetrafluorooxalate phosphate (LiTFOP).

According to an embodiment of this application, the electrolytic solution further includes a first additive. The first additive includes at least one of 1,3-propane sultone, fluoroethylene carbonate, vinylene carbonate, succinic anhydride, or maleic anhydride.

According to an embodiment of this application, a content of the first additive is 0.001 to 0.2 gram per 1 $cm^2$ of the first region.

According to an embodiment of this application, the electrolytic solution further includes a second additive. The second additive includes at least one of lithium tetrafluoroborate ($LiBF_4$), lithium bis(fluorosulfonyl)imide (LiFSI), lithium bis(trifluoromethylsulfonyl)imide (LiTFSI), lithium 4,5-dicyano-2-(trifluoromethyl)imidazole (LiTDI), lithium difluoro(oxalato)borate (LiDFOB), lithium bis(oxalato)borate (LiBOB), adiponitrile (ADN), succinonitrile (SN), 1,3,6-hexanetricarbonitrile (HTCN), 1,2,3-tris(2-cyanooxy)propane, 1,4-dicyano-2-butene or glutaronitrile or tris(2-cyanoethyl)phosphine. Based on a weight of the electrolytic solution, a content of the second additive is 0.1 wt % to 10 wt %.

According to an embodiment of this application, the first region is located at an edge of the negative active material layer, and a width of the first region is less than or equal to 15 μm.

According to an embodiment of this application, an area of the first region is less than or equal to 20% of a total area of the negative active material layer.

According to an embodiment of this application, the negative active material layer includes a negative active material, and a median particle diameter of the negative active material is 5 μm to 20 μm.

According to an embodiment of this application, a compacted density of the negative electrode is 1.3 $g/cm^3$ to 1.8 $g/cm^3$.

In another embodiment, this application provides an electronic device. The electronic device contains the electrochemical device described above.

Additional aspects and advantages of some embodiments of this application will be partly described or illustrated herein later or expounded through implementation of an embodiment of this application.

BRIEF DESCRIPTION OF DRAWINGS

For ease of describing an embodiment of this application, the following outlines the drawings needed for describing an embodiment of this application or the prior art. Evidently, the drawings outlined below are merely a part of embodiments in this application. Without making any creative efforts, a person skilled in the art can still derive the drawings of other embodiments according to the structures illustrated in the drawings.

DETAILED DESCRIPTION

Figure 1:
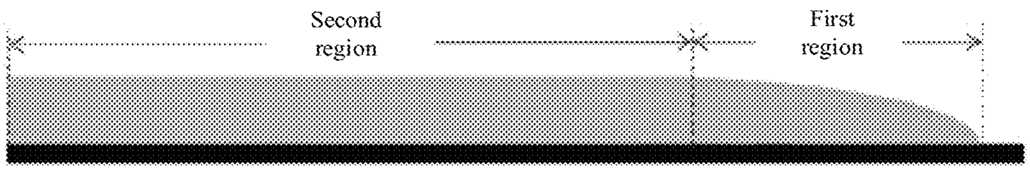
FIG. 1 shows a schematic diagram of a thinned region of a negative active material layer.

Some embodiments of this application will be described in detail below. Throughout the specification of this application, the same or similar components and the components serving the same or similar functions are represented by similar reference numerals. An embodiment described herein with reference to the drawings is descriptive and illustrative in nature, and is intended to enable a basic understanding of this application. No embodiment of this application is to be construed as a limitation on this application.

Unless otherwise expressly specified, the following terms used herein have the meanings defined below.

The term "approximately" is intended to describe and represent small variations. When used together with an event or situation, the term "approximately" may represent an example in which the event or situation occurs exactly or an example in which the event or situation occurs very approximately. For example, when used together with a numerical value, the term "approximately" may represent a variation range falling within ±10% of the numerical value, such as ±5%, ±4%, ±3%, ±2%, ±1%, ±0.5%, ±0.1%, or ±0.05% of the numerical value. In addition, a quantity, a ratio, or another numerical value herein is sometimes expressed in the format of a range. Understandably, such a range format is set out for convenience and brevity, and needs to be flexibly understood to include not only the numerical values explicitly specified and defined by the range, but also all individual numerical values or sub-ranges covered in the range as if each individual numerical value and each sub-range were explicitly specified.

In the detailed description of embodiments and claims, a list of items referred to by using the terms such as "at least one of" may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

During manufacture of an electrochemical device (such as a lithium-ion battery), an active material layer is formed by applying an active material slurry onto a current collector by means of coating, so as to obtain an electrode. However, due to some fluidity of the applied active material slurry and limitations of the existing production process, the active material layer on the current collector inevitably incurs a phenomenon that an edge region is thinner than a center region. As shown in FIG. 1, the active material layer on the current collector includes a gradually thinning first region (that is, a thinned region) and a second region of substantially uniform thickness. Existence of the thinned region exerts an adverse effect on the performance of the electrochemical device. For example, at a thinned region of a negative electrode, a contact interface between an electrolytic solution and the negative electrode becomes poor, and a stress is not uniform, thereby resulting in an increase in polarization; space for lithium intercalation in the negative electrode is not sufficient; and a difference in current distribution exists in the negative active material layer during initial charging, and defers film formation in the thinned region. Such factors lead to an increase in side reactions during cycling of the electrochemical device, make lithium plating prone to occur, and result in poor cycle performance.

To solve such problems, this application makes up for the adverse effect of the thinned region of the negative active material layer by using an electrolytic solution that includes a given content of a salt containing a P—O bond, thereby improving the cycle performance of the electrochemical device. Specifically, this application provides an electrochemical device. The electrochemical device includes a positive electrode, a negative electrode, and an electrolytic solution that are to be described below. In some embodiments, the electrochemical device further includes a separator disposed between the positive electrode and the negative electrode.

Negative Electrode

The negative electrode used in the electrochemical device in this application includes a negative current collector and a negative active material layer disposed on at least one surface of the negative current collector. The negative active material layer includes a first region and a second region. A thickness D1 of any position of the first region is less than an average thickness D2 of the second region.

In some embodiments, D1 and D2 satisfy: $0<D1\leq D2\times 97\%$.

In some embodiments, the first region is located at an edge of the negative active material layer, and a width of the first region is less than or equal to 15 μm. In some embodiments, the width of the first region is less than or equal to 12 μm. In some embodiments, the width of the first region is less than or equal to 10 μm. In some embodiments, the width of the first region is less than or equal to 8 μm. In some embodiments, the width of the first region is less than or equal to 5 μm. The "width of the first region" means a distance from a junction between the negative current collector part uncoated with the negative active material and the negative current collector part coated with the negative active material to a point at which the thickness of the negative active material layer reaches 97% of the thickness of the center region of the negative active material layer. Alternatively, the "width of the first region" is a distance from an edge position of the negative active material layer to a point at which the thickness of the negative active material layer reaches 97% of the thickness of the center region of the negative active material layer. When the width of the first region falls within the foregoing range, the thinned region of the negative active material layer is relatively small, thereby improving the cycle performance of the electrochemical device.

In some embodiments, the area of the first region is less than or equal to 20% of the total area of the negative active material layer. In some embodiments, the area of the first region is less than or equal to 18% of the total area of the negative active material layer. In some embodiments, the area of the first region is less than or equal to 15% of the total area of the negative active material layer. In some embodiments, the area of the first region is less than or equal to 12% of the total area of the negative active material layer. In some embodiments, the area of the first region is less than or equal to 10% of the total area of the negative active material layer. In some embodiments, the area of the first region is less than or equal to 8% of the total area of the negative active material layer. In some embodiments, the area of the first region is less than or equal to 5% of the total area of the negative active material layer. A smaller area of the first region imposes a higher requirement on the process, and leads to a higher process cost. When the percentage of the area of the first region in the total area of the negative active material layer falls within the foregoing range, the adverse effect of the thinned region of the negative active material layer is effectively reduced, and the cycle performance of electrochemical device is improved without greatly increasing the process cost.

In some embodiments, the negative active material layer includes a negative active material. In some embodiments, the negative active material is any substance that can electrochemically occlude and release metal ions such as lithium ions. In some embodiments, the negative active material includes one or more of a carbonaceous material, a silicon-carbon material, an alloy material, or a lithium-containing metallic composite oxide material.

In some embodiments, the median particle diameter of the negative active material is 5 μm to 20 m. In some embodiments, the median particle diameter of the negative active material is 8 μm to 18 μm. In some embodiments, the median particle diameter of the negative active material is 10 μm to 15 μm. In some embodiments, the median particle diameter of the negative active material is 5 μm, 8 μm, 10 μm, 12 in, 15 μm, 18 μm, 20 μm, or a value falling within a range formed by any two thereof. "Median particle diameter" is a particle diameter of the negative active material measured when the cumulative volume percentage of the negative active material particles reaches 50% in a volume-based particle size distribution by counting from a small-diameter side, that is, a particle diameter than which the volume of the negative active material particles smaller accounts for 50% of the total volume of the negative active material particles. When the median particle diameter of the negative active material falls within the foregoing range, the cycle performance of the electrochemical device is further improved.

In some embodiments, the negative active material layer further includes a negative binder. In some embodiments, the negative binder includes one or more of styrene butadiene rubber, fluororubber, or ethylene propylene diene.

In some embodiments, the negative active material layer further includes a negative conductive agent. In some embodiments, the negative conductive agent includes one or more of a conductive metal material or a conductive polymer. In some embodiments, the negative conductive agent includes one or more of a carbon material or the like. In some embodiments, the carbon material includes, but is not limited to, graphite, carbon black, acetylene black, or Ketjen black.

In some embodiments, the compacted density of the negative electrode is 1.3 $g/cm^3$ to 1.8 $g/cm^3$. In some embodiments, the compacted density of the negative electrode is 1.4 $g/cm^3$ to 1.6 $g/cm^3$. In some embodiments, the compacted density of the negative electrode is 1.5 $g/cm^3$.

In some embodiments, the negative current collector includes a negative conductive material. In some embodiments, the negative current collector includes, but is not limited to, copper, nickel, and stainless steel. In some embodiments, the surface of the negative current collector is roughened. The roughened surface can improve adhesiveness of the negative active material. In some embodiments, the roughened negative current collector includes, but is not limited to, an electrolytic copper foil.

In some embodiments, one surface of the negative current collector is coated with a negative active material layer. In some embodiments, both surfaces of the negative current collector are coated with a negative active material layer. In some embodiments, at least one surface of the negative current collector includes a region uncoated with the negative active material layer, also referred to as an blank foil region.

Electrolytic Solution

The electrolytic solution used in the electrochemical device in this application includes a salt containing a P—O bond. The content of the salt containing a P—O bond is less than or equal to 0.05 gram per 1 $cm^2$ of the first region.

In some embodiments, the salt containing a P—O bond is an inorganic salt containing a P—O bond.

In some embodiments, the salt containing a P—O bond includes at least one of $LiPO_2F_2$, $NaPO_2F_2$, $KPO_2F_2$, $CsPO_2F_2$, lithium difluorobisoxalate phosphate, or lithium tetrafluorooxalate phosphate (LiTFOP).

In some embodiments, the content of the salt containing a P—O bond is less than or equal to 0.04 gram per 1 $cm^2$ of the first region. In some embodiments, the content of the salt containing a P—O bond is less than or equal to 0.03 gram per 1 $cm^2$ of the first region. In some embodiments, the content of the salt containing a P—O bond is less than or equal to 0.02 gram per 1 $cm^2$ of the first region. In some embodiments, the content of the salt containing a P—O bond is less than or equal to 0.01 gram per 1 $cm^2$ of the first region. In some embodiments, the content of the salt containing a P—O bond is less than or equal to 0.005 gram per 1 $cm^2$ of the first region. In some embodiments, the content of the salt containing a P—O bond is less than or equal to 0.001 gram per 1 $cm^2$ of the first region. In some embodiments, the content of the salt containing a P—O bond is less than or equal to 0.0005 gram per 1 $cm^2$ of the first region.

During initial charging of the electrochemical device, the salt containing a P—O bond is richly concentrated on the surface of the negative electrode preferentially, thereby not only facilitating film formation in the second region of the negative active material layer, but more importantly, also facilitating film formation in the first region of the negative active material layer and enhancing stability of the formed films. This reduces the occurrence of side reactions in the first region of the negative active material layer, reduces the thickness variation caused by by-products in the first region, and improves cycle stability of the electrochemical device. In addition, the use of the salt containing a P—O bond reduces the adverse effect caused by the difference in the current distribution between the first region and the second region of the negative active material layer, and ensures the effectiveness of the film formation in the first region of the negative active material layer. The electrolytic solution that includes the foregoing content of salt containing a P—O bond can reduce the adverse effect of the thinned region of the negative active material layer, thereby improving the cycle performance of the electrochemical device significantly.

In some embodiments, the electrolytic solution further includes a first additive. A reduction potential of the first additive is 2.5 V or lower. When the reduction potential of the first additive is 2.5 V or lower, the first additive can form a protection layer on the surface of the negative electrode, thereby reducing the adverse effect of the thinned region of the negative active material layer, and in turn, significantly improving the cycle performance of the electrochemical device.

In some embodiments, the first additive includes at least one of 1,3-propane sultone (PS), fluoroethylene carbonate (FEC), vinylene carbonate (VC), succinic anhydride, or maleic anhydride.

In some embodiments, the first additive includes 1,3-propane sultone (PS) and fluoroethylene carbonate (FEC).

In some embodiments, the weight percent of the 1,3-propane sultone in the electrolytic solution is greater than the weight percent of the fluoroethylene carbonate in the electrolytic solution. In some embodiments, a ratio of the weight percent of the 1,3-propane sultone in the electrolytic solution to the weight percent of the fluoroethylene carbonate in the electrolytic solution is less than or equal to 1.5. When the ratio of the weight percent falls within such a range, the cycle performance of the electrochemical device is improved, and the gassing amount of the electrochemical device is reduced.

In some embodiments, the first additive includes 1,3-propane sultone (PS), fluoroethylene carbonate (FEC), and vinylene carbonate (VC).

In some embodiments, the content of the first additive is 0.001 to 0.2 gram per 1 $cm^2$ of the first region. In some embodiments, the content of the first additive is 0.005 to 0.2 gram per 1 $cm^2$ of the first region. In some embodiments, the content of the first additive is 0.01 to 0.15 gram per 1 $cm^2$ of the first region. In some embodiments, the content of the first additive is 0.05 to 0.13 gram per 1 $cm^2$ of the first region. In some embodiments, the content of the first additive is 0.08 to 0.1 gram per 1 $cm^2$ of the first region. In some embodiments, the content of the first additive is 0.001 gram, 0.005 gram, 0.01 gram, 0.03 gram, 0.05 gram, 0.07 gram, 0.1 gram, 0.15 gram, 0.2 gram, or a value falling within a range formed by any two thereof per 1 $cm^2$ of the first region. When the content of the first additive in the electrolytic solution falls within the foregoing range, the cycle performance of the electrochemical device is further improved significantly.

In some embodiments, the electrolytic solution further includes a second additive. The second additive includes at least one of lithium tetrafluoroborate ($LiBF_4$), lithium bis(fluorosulfonyl)imide (LiFSI), lithium bis(trifluorosulfonyl)imide (LiTFSI), lithium 4,5-dicyano-2-(trifluoromethyl)imidazole (LiTDI), lithium difluoro(oxalato)borate (LiDFOB), lithium bis(oxalato)borate, adiponitrile (ADN), succinonitrile, 1,3,6-hexanetricarbonitrile (HTCN), 1,2,3-tris(2-cyanooxy)propane, 1,4-dicyano-2-butene or glutaronitrile or tris(2-cyanoethyl)phosphine. In some embodiments, the second additive includes $LiBF_4$ and LiDFOB. In some embodiments, the second additive includes HTCN and LiDFOB. In some embodiments, the second additive includes $LiBF_4$, LiDFOB, and LiTFSI. In some embodiments, the second additive includes HTCN, LiDFOB, and LiTFSI.

The second additive forms a protection layer on the surface of the positive electrode to reduce side reactions at the positive electrode and also reduce the dissolution of metal ions of the positive electrode. During cycling of the electrochemical device, the stability of the negative protection film is affected by products of the side reactions at the positive electrode. Therefore, the second additive serves a function of protecting the negative electrode while protecting the positive electrode, thereby improving the cycle performance of the electrochemical device.

In some embodiments, based on the weight of the electrolytic solution, the content of the second additive is 0.1 wt % to 10 wt %. In some embodiments, based on the weight of the electrolytic solution, the content of the second additive is 0.2 wt % to 5 wt %. In some embodiments, based on the weight of the electrolytic solution, the content of the second additive is 0.5 wt % to 3 wt %. In some embodiments, based on the weight of the electrolytic solution, the content of the second additive is 1 wt % to 2 wt %. In some embodiments, based on the weight of the electrolytic solution, the content of the second additive is 0.1 wt %, 0.5 wt %, 1 wt %, 2 wt %, 3 wt %, 4 wt %, 5 wt %, 6 wt %, 7 wt %, 8 wt %, 9 wt %, 10 wt %, or a value falling within a range formed by any two thereof. When the content of the second additive in the electrolytic solution falls within the foregoing range, the cycle performance of the electrochemical device is further improved significantly.

The electrolytic solution applicable to this application includes $LiPF_6$. In some embodiments, the concentration of $LiPF_6$ falls within a range of 0.8 mol/L to 3 mol/L, a range of 0.8 mol/L to 2.5 mol/L, a range of 0.8 mol/L to 2 mol/L, or a range of 1 mol/L to 2 mol/L. In some embodiments, the concentration of the lithium salt is approximately 1 mol/L, approximately 1.15 mol/L, approximately 1.2 mol/L, approximately 1.5 mol/L, approximately 2 mol/L, or approximately 2.5 mol/L.

Solvents applicable to the electrolytic solution in an embodiment of this application include, but are not limited to, cyclic carbonate, chain carbonate, cyclic carboxylate, chain carboxylate, cyclic ether, chain ether, a phosphorus-containing organic solvent, a sulfur-containing organic solvent, and an aromatic fluorine-containing solvent.

In some embodiments, the cyclic carbonate includes, but is not limited to, ethylene carbonate (EC), propylene carbonate (PC), and butylene carbonate. In some embodiments, the cyclic carbonate contains 3-6 carbon atoms.

In some embodiments, the chain carbonate includes, but is not limited to: chain carbonate such as dimethyl carbonate, ethyl methyl carbonate, diethyl carbonate (DEC), methyl n-propyl carbonate, ethyl n-propyl carbonate, and di-n-propyl carbonate; and fluorine-substituted chain carbonate, such as bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

In some embodiments, the cyclic carboxylate includes, but is not limited to, γ-butyrolactone and γ-valerolactone. In some embodiments, a part of hydrogen atoms of the cyclic carboxylate may be substituted by fluorine.

In some embodiments, the chain carboxylate includes, but is not limited to, methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, a part of hydrogen atoms of the chain carboxylate may be substituted by fluorine. In some embodiments, the fluorine-substituted chain carboxylate includes, but is not limited to, methyl trifluoroacetate, ethyl trifluoroacetate, propyl trifluoroacetate, butyl trifluoroacetate, and 2,2,2-trifluoroethyl trifluoroacetate.

In some embodiments, the cyclic ether includes, but is not limited to, tetrahydrofuran, 2-methyl tetrahydrofuran, 1,3-dioxolane, 2-methyl 1,3-dioxolane, 4-methyl 1,3-dioxolane, 1,3-dioxane, 1,4-dioxane, and dimethoxypropane.

In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, the phosphorus-containing organic solvent includes, but is not limited to, trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3-pentafluoropropyl) phosphate.

In some embodiments, the sulfur-containing organic solvent includes, but is not limited to, sulfolane, 2-methyl sulfolane, 3-methyl sulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a part of hydrogen atoms of the sulfur-containing organic solvent may be substituted by fluorine.

In some embodiments, the aromatic fluorine-containing solvent includes, but is not limited to, fluorobenzene, difluorobenzene, trifluorobenzene, tetrafluorobenzene, pentafluorobenzene, hexafluorobenzene, and trifluoromethylbenzene.

In some embodiments, the solvent used in the electrolytic solution in this application includes one or more of the foregoing solvents. In some embodiments, the solvent used in the electrolytic solution in this application includes cyclic carbonate, chain carbonate, cyclic carboxylate, chain carboxylate, and any combination thereof. In some embodiments, the solvent used in the electrolytic solution in this application includes an organic solvent containing a material selected from: ethylene carbonate, propylene carbonate, diethyl carbonate, ethyl propionate, propyl propionate, n-propyl acetate, ethyl acetate, and any combination thereof. In some embodiments, the solvent used in the electrolytic solution in this application includes: ethylene carbonate, propylene carbonate, diethyl carbonate, ethyl propionate, propyl propionate, γ-butyrolactone, or any combination thereof.

Positive Electrode

The positive electrode includes a positive current collector and a positive active material disposed on the positive current collector. Specific types of the positive active material are not limited, and may be selected as required.

In some implementation solutions, the positive active material includes a positive electrode material capable of absorbing and releasing lithium (Li). Examples of the positive electrode material capable of absorbing or releasing lithium (Li) may include lithium cobalt oxide, lithium nickel cobalt manganese oxide, lithium nickel cobalt aluminum oxide, lithium manganese oxide, lithium iron manganese phosphate, lithium vanadium phosphate, lithium vanadyl phosphate, lithium iron phosphate, lithium titanium oxide, and a lithium-rich manganese-based materials.

Specifically, the chemical formula of the lithium cobalt oxide may be chemical formula 1:

$Li_xCo_aM1_bO_{2-c}$ Chemical formula 1, wherein M1 is at least one element selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), fluorine (F), and sulfur (S). The values of x, a, b, and c fall within the ranges $0.8 \le x \le 1.2$, $0.8 \le a \le 1$, $0 \le b \le 0.2$, $-0.1 \le c \le 0.2$, respectively.

The chemical formula of lithium nickel cobalt manganese oxide or lithium nickel cobalt aluminum oxide may be chemical formula 2:

$Li_yNi_dM2_eO_{2-f}$ Chemical formula 2, wherein M2 is at least one element selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), silicon (Si), fluorine (F), and sulfur (S). The values of y, d, e, and f fall within the ranges $0.8 \le y \le 1.2$, $0.3 \le d \le 0.98$, $0.02 \le e \le 5$ 0.7, $-0.1 \le f \le 0.2$, respectively.

The chemical formula of the lithium manganese oxide may be chemical formula 3:

$Li_zMn_{2-g}M3_gO_{4-h}$ Chemical formula 3, wherein M3 is at least one element selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), niobium (Nb), tantalum (Ta), and tungsten (W). The values of z, g, and h fall within the ranges $0.8 \le z \le 1.2$, $0 \le g \le 1.0$, and $-0.2 \le h \le 0.2$, respectively.

In some embodiments, the positive active material layer may be coated with a coating layer on a surface thereof, or may be mixed with another compound coated with a coating layer. The coating layer may include at least one compound of a coating element. The compound of a coating element is selected from an oxide of a coating element, a hydroxide of a coating element, an oxyhydroxide of a coating element, an oxycarbonate of a coating element, and a hydroxycarbonate of a coating element. The compound included in the coating layer may be non-crystalline or crystalline. The coating element included in the coating layer may include Mg, Al, Co, K, Na, Ca, Si, Ti, V, Sn, Ge, Ga, B, As, Zr, or F, or a mixture thereof. The coating layer may be applied by any method as long as the method does not adversely affect performance of the positive active material. For example, the method may include any coating method well known to a person of ordinary skill in the art, such as spraying and dip-coating.

In some implementation solutions, the positive active material layer further includes a binder, and optionally, further includes a positive conductive material.

The binder strengthens the bonding between particles of the positive active material and the bonding between the positive active material and the current collector. Examples of the binder include, but are not limited to, polyvinyl alcohol, hydroxypropyl cellulose, diacetyl cellulose, polyvinyl chloride, carboxylated polyvinyl chloride, polyvinyl fluoride, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, and nylon.

The positive active material layer includes a positive conductive material, thereby imparting conductivity to the electrode. The positive conductive material may include any conductive material that does not cause a chemical change. Examples of the positive conductive material include, but are not limited to, a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

The positive current collector used for the electrochemical device according to this application may be, but without being limited to, aluminum (Al).

Separator

In some embodiments, the electrochemical device according to this application includes a separator disposed between the positive electrode and the negative electrode to prevent a short circuit caused by contact between the two electrodes, and to allow passage of lithium ions at the same time.

The material and the shape of the separator used in the electrochemical device in this application are not particularly limited, and the separator may be based on any technology disclosed in the prior art. In some embodiments, the separator includes a polymer (such as synthetic resin) or an inorganic compound (ceramics) or the like formed from a material that is stable to the electrolytic solution in this application. In some embodiments, the separator includes a porous film made of the polymer or the inorganic compound. In some embodiments, the separator includes a laminated film formed by laminating two or more porous films. In some embodiments, the polymer includes, but is not limited to, polytetrafluoroethylene, polypropylene, and polyethylene.

In some embodiments, the separator includes the porous film (base material layer) and a polymer compound layer disposed on one surface or both surfaces of the base material layer. The polymer compound layer improves the adhesiveness of the separator to the positive electrode and the negative electrode, and suppresses deflection of the electrode plate that is being wound, thereby suppressing the decomposition reaction of the electrolytic solution and suppressing the leakage of the electrolytic solution that infiltrates the base material layer. By virtue of such a separator used in the electrochemical device, even in the case of repeated charge/discharge, the resistance of the electrochemical device does not increase significantly, thereby suppressing the expansion of the electrochemical device.

In some embodiments, the polymer compound layer includes, but is not limited to, polyvinylidene difluoride. The polyvinylidene difluoride is excellent in physical strength and electrochemical stability. The polymer compound layer may be formed by: preparing a solution in which the polymer material is dissolved, and then coating the base material layer with the solution or soaking the base material layer in the solution, and finally drying the base material layer.

Use of the Electrochemical Device

The electrochemical device according to this application includes any device in which an electrochemical reaction occurs. Specific examples of the electrochemical device include all types of primary batteries or secondary batteries. In particular, the electrochemical device is a lithium secondary battery, including a lithium metal secondary battery, a lithium-ion secondary battery, a lithium polymer secondary battery, or a lithium-ion polymer secondary battery.

The electrochemical device according to this application may be used for purposes not particularly limited, and may be used for any purpose known in the prior art. In an embodiment, the electrochemical device according to this application is applicable to, but without being limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, and the like.

Embodiments

The following evaluates performance of the lithium-ion batteries according to some embodiments and comparative embodiments of preparing a lithium-ion battery according to this application.

1. Preparing a Lithium-Ion Battery

Comparative Embodiment 1

(1) Preparing a Negative Electrode

Mixing artificial graphite (with a median particle diameter of 12.0 μm) as a negative active material, Super P as a conductive agent, sodium carboxymethyl cellulose (CMC), and styrene butadiene rubber (SBR) as a binder at a mass ratio of 96.4:1.5:0.5:1.6. Adding deionized water, and stirring well to obtain a negative slurry in which the solid content is 54 wt %. Coating a copper foil with the negative slurry evenly, drying the copper foil at 85° C., and then performing cold pressing, die-cutting, slitting, and winding. Drying the copper foil under a 120° C. vacuum condition for 12 hours to obtain a negative electrode with a length of 1544.0±5.0 mm and a width of 66.5±1.0 mm. The total area of a negative active material layer on a single side is 1544.0×66.5=102676 ($mm^2$), that is, approximately 1027 $cm^2$. The compacted density of the negative electrode is 1.6 $g/cm^3$.

Adjusting and controlling the width and area of the first region of the negative active material layer by adjusting the viscosity of the negative slurry, by using die heads of different specifications, by controlling a distance from a coating die head to a coating roller, by controlling the running speed of the base material, or by other means according to the settings of the following comparative embodiments and embodiments.

The width of the first region corresponding to the area of the first region in each comparative embodiment and each embodiment in Table 1 is shown in the following table:

| Area of first region ($cm^2$) | Width of first region (mm) |
|---|---|
| 5 | 0.3 |
| 15 | 1.0 |
| 40 | 2.6 |
| 54 | 3.5 |
| 70 | 4.5 |
| 93 | 6.0 |
| 124 | 8.0 |
| 185 | 12.0 |
| 232 | 15.0 |

(2) Preparing a Positive Electrode

Mixing $Li(Ni_{0.8}Co_{0.08}Mn_{0.07})Al_{0.05}O_2$ as a positive active material, Super-P as a conductive agent, and polyvinylidene difluoride at a mass ratio of 97:1.4:1.6 in N-methylpyrrolidone (NMP), and stirring evenly to obtain a positive slurry in which the solid content is 72 wt %. Coating an aluminum foil with the positive slurry, drying the aluminum foil at 85° C., and then performing cold calendering, die-cutting, slitting, and tab welding. Subsequently, drying the aluminum foil under an 85° C. vacuum condition for 4 hours to obtain a positive electrode.

(3) Preparing an Electrolytic Solution

Mixing ethylene carbonate (EC), propylene carbonate (PC), ethyl methyl carbonate (EMC), and diethyl carbonate (DEC) at a mass ratio of 15:25:50:10 between EC, PC, DEC, and EMC in a dry argon environment. Adding an additive according to the settings in each embodiment and each comparative embodiment, dissolving and stirring the mixture well, and then adding a lithium salt $LiPF_6$. Mixing well to obtain a base electrolytic solution in which the concentration of $LiPF_6$ is 1.2 mol/L.

Adding a salt containing a P—O bond, a first additive, and/or a second additive into the base electrolytic solution according to the following settings in each comparative embodiment and each embodiment, so as to obtain an electrolytic solution.

(4) Preparing a Separator

Selecting a polyethylene (PE) film that is 7 μm thick, coating the PE film with a PVDF slurry and an inorganic particle slurry (in which a mass ratio between flake boehmite and $Al_2O_3$ is 70:30), drying the PE film, and leaving the coating thickness to be 3 μm, so as to obtain a separator.

(5) Preparing a Lithium-Ion Battery

Winding the obtained positive electrode, separator, and negative electrode in sequence to form a bare cell, putting the bare cell into an outer package foil, and leaving an injection port. Injecting the electrolytic solution from the injection port, sealing the port, and performing steps such as chemical formation (by charging the cell at a constant current of 0.02 C until the voltage reaches 3.3 V, and then charging the cell at a constant current of 0.1 C until the voltage reaches 3.6 V) and capacity test to obtain a lithium-ion battery (with dimensions of 9.1 mm thick, 49 mm wide, and 74 mm long, approximately).

2. Test Methods (1) Methods for Testing the Cycle Capacity Retention Rate and the Cycle Thickness Expansion Rate of the Lithium-Ion Battery Putting the lithium-ion battery into a 25° C. thermostat, and leaving the battery to stand for 30 minutes so that the temperature of the lithium-ion battery is constant. Measuring the initial thickness $H_0$ of the lithium-ion battery. Charging, after the lithium-ion battery reaches a constant-temperature state, the lithium-ion battery at a constant current of 1.0 C until the voltage reaches 4.2 V, and then charging the battery at a constant voltage of 4.2 V until the current reaches 0.05 C. Subsequently, discharging the battery at a constant current of 4 C until the voltage reaches 2.8 V, thereby completing a charge-and-discharge cycle. Recording the first-cycle discharge capacity $C_0$. Repeating the foregoing steps until the lithium-ion battery completes 600 charge-and-discharge cycles, and then stopping the test. Recording the discharge capacity $C_1$ and the thickness $H_1$ of the lithium-ion battery after completion of the cycling.

Calculating the cycle capacity retention rate and the cycle thickness expansion rate of the lithium-ion battery according to the following formula:

$$\text{Cycle capacity retention rate} = C_1/C_0 \times 100\%; \text{ and}$$

$$\text{Cycle thickness expansion rate} = (H_1 - H_0)/H_0 \times 100\%.$$

Figure 2:
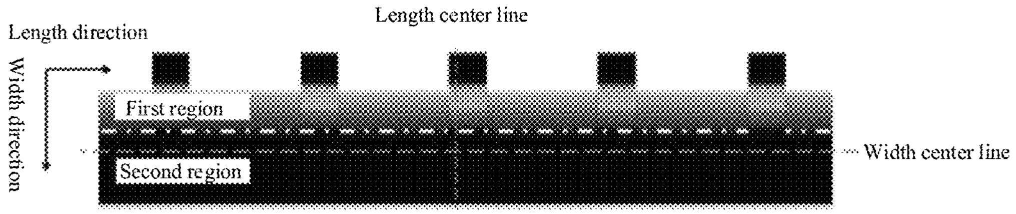
FIG. 2 shows a schematic diagram of a position of a thinned region of a negative active material layer.

(2) Method for Measuring the Thicknesses of the First Region and the Second Region of the Negative Active Material Layer In a case that the structure of the negative active material layer is shown in FIG. 2, making a cross section along a length center line of the negative active material layer and taking a specimen that is 1 cm in length centered on a width center line of the negative active material layer. Selecting 10 points on the specimen at random to determine the thickness of the negative active material layer. Measuring the thickness values by using a digital microscope system (VHX-950F), and calculating an average value $E_0$ of the total thickness of the negative electrode plate and an average value $E_1$ of the thickness of the current collector. Calculating the thickness D2 of the second region of the negative active material layer according to the following formula: $D2=(E_0-E_1)/2$.

Making a cross section along the length center line, measuring the thickness D1 at 5 continuous points at intervals of 0.1 mm by starting from an edge region of the negative active material layer, where the thickness is a distance between two surfaces of the negative active material layer on any single side, one surface is located away from the current collector and the other surface is in contact with the current collector. When the thicknesses at 3 points of such points satisfy $D1>D2\times97\%$, determining that a distance from a point closest to the edge of the negative active material layer to the edge of the negative active material layer is the width of the first region of the negative active material layer. The thickness values are accurate to 0.01 mm. During the test, the selected cross section needs to include the first region and the second region of the negative active material layer.

Figure 3:
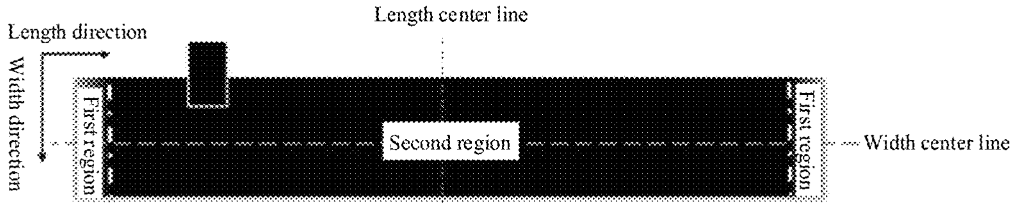
FIG. 3 shows a schematic diagram of a position of a thinned region of another negative active material layer.

When the structure of the negative active material layer is shown in FIG. 3, the thickness is measured in basically the same way by making a cross section along the width center line.

Figure 4:
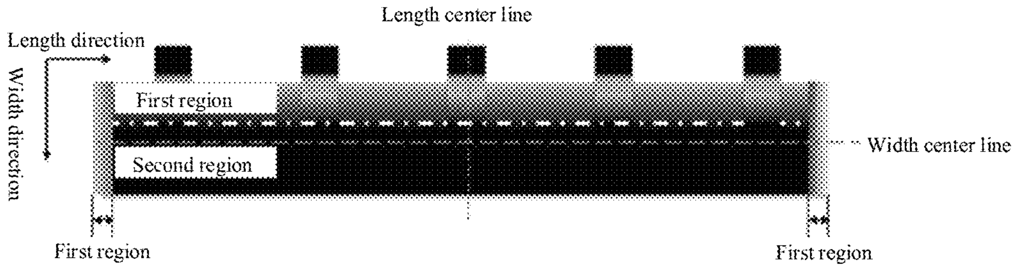
FIG. 4 shows a schematic diagram of a position of a thinned region of still another negative active material layer.

When the structure of the negative active material layer is shown in FIG. 4, the thickness is measured in basically the same way by making a cross section along the length center line and a cross section along the width center line separately.

(3) Method for Measuring the Content of the Salt Containing a P—O Bond in the Electrolytic Solution Discharging the lithium-ion battery at a rate of 0.2 C until the voltage reaches 2.8 V, weighing the lithium-ion battery to obtain a weight $M_0$, cutting away the tabs and the outer package to obtain a bare cell. Centrifuging the bare cell to obtain the electrolytic solution, and then measuring the content of anions in the electrolytic solution by using an ion chromatograph (IC) (model: Thermo Fisher Scientific, AQUION) to obtain a relative content Q of the salt containing a P—O bond in the electrolytic solution. Subsequently, soaking the centrifuged bare cell in dimethyl carbonate (DMC) for 72 hours, and then drying the bare cell. Weighing the total mass of the dried bare cell, tabs, and outer package, denoted as $M_1$. Calculating the mass of the salt containing a P—O bond in the bare cell according to the following formula: $\text{mass}=(M_0-M_1)\times Q$. Dividing the mass of the salt containing a P—O bond by the total area of the first region of the negative active material layer, so as to obtain the mass of the salt containing a P—O bond per unit area of the first region.

Determining the types of the first additive and the second additive by using an ion chromatograph (IC) (model: Thermo Fisher Scientific, AQUION) or a gas chromatograph (GC) (model: Agilent 7890A-5975C).

3. Test Results

Table 1 shows how the ingredients of the electrolytic solution and the first region in the negative active material layer in each comparative embodiment and each embodiment affect the cycle performance of the lithium-ion battery. The content of the salt containing a P—O bond or the content of the first additive per unit area means the weight of the salt containing a P—O bond or the weight of the first additive per 1 $cm^2$ of the first region. In each embodiment and each comparative embodiment shown in Table 1, the total area of the negative active material layer on a single side is 1027 $cm^2$.

TABLE 1

| | Area of first region ($cm^2$) | Salt containing a P-O bond: Type | Salt containing a P-O bond: Content (g) | Salt containing a P-O bond: Content per unit area ($g/cm^2$) | First additive: Type | First additive: Content per unit area ($g/cm^2$) | Second additive: Type | Second additive: Content (wt %) | Cycle performance: Capacity retention rate | Cycle performance: Thickness expansion rate |
|---|---|---|---|---|---|---|---|---|---|---|
| Comparative Embodiment 1 | 5 | — | — | — | — | — | — | — | 69.3% | 17.8% |
| Comparative Embodiment 2 | 15 | — | — | — | — | — | — | — | 66.8% | 18.3% |
| Comparative Embodiment 3 | 40 | — | — | — | — | — | — | — | 60.2% | 20.6% |
| Comparative Embodiment 4 | 54 | — | — | — | — | — | — | — | 56.1% | 23.9% |
| Comparative Embodiment 5 | 70 | — | — | — | — | — | — | — | 52.6% | 26.3% |
| Comparative Embodiment 6 | 93 | — | — | — | — | — | — | — | 51.7% | 27.5% |
| Comparative Embodiment 7 | 124 | — | — | — | — | — | — | — | 50.8% | 28.2% |
| Comparative Embodiment 8 | 185 | — | — | — | — | — | — | — | 49.4% | 29.0% |
| Comparative Embodiment 9 | 232 | — | — | — | — | — | — | — | 48.8% | 29.5% |
| Embodiment 1 | 5 | $LiPO_2F_2$ | 0.25 | 0.0500 | — | — | — | — | 87.1% | 9.3% |
| Embodiment 2 | 40 | $LiPO_2F_2$ | 0.004 | 0.0001 | — | — | — | — | 75.4% | 14.7% |
| Embodiment 3 | 40 | $LiPO_2F_2$ | 0.02 | 0.0005 | — | — | — | — | 82.1% | 12.5% |
| Embodiment 4 | 40 | $LiPO_2F_2$ | 0.1 | 0.0025 | — | — | — | — | 85.8% | 10.9% |
| Embodiment 5 | 40 | $LiPO_2F_2$ | 0.2 | 0.0050 | — | — | — | — | 86.4% | 10.2% |
| Embodiment 6 | 70 | $LiPO_2F_2$ | 0.05 | 0.0007 | — | — | — | — | 82.3% | 12.4% |
| Embodiment 7 | 70 | $LiPO_2F_2$ | 0.1 | 0.0014 | — | — | — | — | 83.6% | 11.5% |
| Embodiment 8 | 15 | $LiPO_2F_2$ | 0.02 | 0.0013 | — | — | — | — | 82.4% | 12.3% |
| Embodiment 9 | 70 | $LiPO_2F_2$ | 0.02 | 0.0003 | — | — | — | — | 79.8% | 12.8% |
| Embodiment 10 | 93 | $LiPO_2F_2$ | 0.02 | 0.0002 | — | — | — | — | 79.1% | 12.9% |
| Embodiment 11 | 124 | $LiPO_2F_2$ | 0.05 | 0.0004 | — | — | — | — | 78.3% | 13.7% |
| Embodiment 12 | 185 | $LiPO_2F_2$ | 0.02 | 0.0001 | — | — | — | — | 79.0% | 13.0% |
| Embodiment 13 | 232 | $LiPO_2F_2$ | 0.1 | 0.0004 | — | — | — | — | 79.2% | 12.8% |
| Embodiment 14 | 40 | $LiPO_2F_2$ | 0.02 | 0.0005 | FEC | 0.0005 | — | — | 84.2% | 11.8% |
| Embodiment 15 | 40 | $LiPO_2F_2$ | 0.02 | 0.0005 | FEC | 0.0025 | — | — | 86.5% | 10.0% |
| Embodiment 16 | 40 | $LiPO_2F_2$ | 0.02 | 0.0005 | VC | 0.0001 | — | — | 82.6% | 12.4% |
| Embodiment 17 | 40 | $LiPO_2F_2$ | 0.02 | 0.0005 | FEC+ PS | 0.0025 + 0.0025 | — | — | 87.0% | 9.5% |
| Embodiment 18 | 40 | $LiPO_2F_2$ | 0.02 | 0.0005 | FEC+ PS | 0.0125 + 0.0100 | — | — | 87.7% | 9.0% |
| Embodiment 19 | 40 | $LiPO_2F_2$ | 0.02 | 0.0005 | PS | 0.0025 | — | — | 86.3% | 10.5% |
| Embodiment 20 | 5 | $LiPO_2F_2$ | 0.02 | 0.0005 | FEC+ PS | 0.1505 + 0.0505 | — | — | 85.4% | 11.9% |

TABLE 1-continued

| | Area of first region ($cm^2$) | Salt containing a P-O bond: Type | Salt containing a P-O bond: Content (g) | Salt containing a P-O bond: Content per unit area ($g/cm^2$) | First additive: Type | First additive: Content per unit area ($g/cm^2$) | Second additive: Type | Second additive: Content (wt %) | Cycle performance: Capacity retention rate | Cycle performance: Thickness expansion rate |
|---|---|---|---|---|---|---|---|---|---|---|
| Embodiment 21 | 40 | $LiPO_2F_2$ | 0.02 | 0.0005 | FEC | 0.0025 | $LiBF_4$ | 0.01 | 86.8% | 9.9% |
| Embodiment 22 | 40 | $LiPO_2F_2$ | 0.02 | 0.0005 | FEC | 0.0025 | LiDFOB | 0.1 | 87.2% | 9.7% |
| Embodiment 23 | 40 | $LiPO_2F_2$ | 0.02 | 0.0005 | FEC | 0.0025 | LiFSI | 5.0 | 87.5% | 9.5% |
| Embodiment 24 | 40 | $LiPO_2F_2$ | 0.02 | 0.0005 | FEC | 0.0025 | HTCN | 0.05 | 86.4% | 10.1% |
| Embodiment 25 | 40 | $LiPO_2F_2$ | 0.02 | 0.0005 | FEC | 0.0025 | HTCN | 1.0 | 87.3% | 9.9% |
| Embodiment 26 | 40 | $LiPO_2F_2$ | 0.02 | 0.0005 | FEC | 0.0025 | HTCN | 10.0 | 86.4% | 10.0% |
| Embodiment 27 | 40 | $LiPO_2F_2$ | 0.02 | 0.0005 | FEC | 0.0025 | HTCN | 10.5 | 86.3% | 10.2% |
| Embodiment 28 | 40 | $LiPO_2F_2$ | 0.02 | 0.0005 | FEC+PS | 0.0025 + 0.0025 | HTCN | 1.0 | 87.8% | 9.2% |
| Embodiment 29 | 40 | $LiPO_2F_2$ | 0.02 | 0.0005 | FEC+PS | 0.0025 + 0.0025 | HTCN+LiDFOB | 1.0 + 0.1 | 88.0% | 9.1% |
| Embodiment 30 | 40 | $LiPO_2F_2$ | 0.02 | 0.0005 | FEC | 0.0025 | $LiBF_4$+LiDFOB | 0.01 + 0.1 | 87.5% | 9.3% |
| Embodiment 31 | 40 | $LiPO_2F_2$ | 0.02 | 0.0005 | FEC | 0.0025 | $LiBF_4$+LiDFOB+LiFSI | 0.01 + 0.1 + 3.0 | 87.9% | 9.1% |
| Embodiment 32 | 40 | $LiPO_2F_2$ | 0.02 | 0.0005 | FEC+PS+VC | 0.0025 + 0.0100 + 0.0001 | LiFSI | 3.0 | 88.5% | 8.7% |
| Embodiment 33 | 40 | $LiPO_2F_2$ | 0.02 | 0.0005 | FEC+PS+VC | 0.0025 + 0.0100 + 0.0001 | HTCN+LiFSI+LiDFOB | 1.0 + 3.0 + 0.1 | 88.7% | 8.6% |
| Embodiment 34 | 40 | $NaPO_2F_2$ | 0.02 | 0.0005 | — | — | — | — | 82.3% | 12.2% |
| Embodiment 35 | 40 | $CsPO_2F_2$ | 0.02 | 0.0005 | — | — | — | — | 82.4% | 12.1% |
| Embodiment 36 | 40 | LiDFOP | 0.02 | 0.0005 | — | — | — | — | 82.2% | 12.2% |
| Embodiment 37 | 40 | $LiPO_2F_2$ + LiDFOP | 0.01 + 0.01 | 0.0005 | — | — | — | — | 82.2% | 12.1% |

As shown in Comparative Embodiments 1 to 9, although the reduced area of the first region of the negative active material layer can improve the cycle capacity retention rate and reduce the thickness expansion rate of the lithium-ion battery, the cycle capacity retention rate of the lithium-ion battery is still relatively low, and the thickness expansion rate is still relatively high, both being hardly sufficient to meet the use requirements.

As shown in Embodiments 1 to 13, when the electrolytic solution includes a salt containing a P—O bond and the content of the salt is less than or equal to 0.05 $g/cm^2$, the cycle capacity retention rate of the lithium-ion battery is significantly improved, and the thickness expansion rate is significantly reduced. As shown in Embodiments 34 to 37, different types of salts containing a P—O bond or a combination thereof can achieve substantially equivalent effects.

As shown in Embodiments 14 to 20, when the electrolytic solution further includes a first additive and the content of the first additive is 0.001 to 0.2 $g/cm^2$, the cycle capacity retention rate of the lithium-ion battery is further improved, and the thickness expansion rate is further reduced.

As shown in Embodiments 21 to 27, when the electrolytic solution further includes a second additive and the content of the second additive is 0.1 wt % to 10 wt %, the cycle capacity retention rate of the lithium-ion battery is further improved, and the thickness expansion rate is further reduced. As shown in Embodiments 28 to 33, when a plurality of first additives and/or second additives are used in combination, the cycle capacity retention rate of the lithium-ion battery is further improved, and the thickness expansion rate is further reduced.

In addition, when the area of the first region is less than or equal to 20% of the total area of the negative active material layer, the cycle capacity retention rate of the lithium-ion battery is further improved, and the thickness expansion rate is further reduced.

Table 2 shows how the median particle diameter of the negative active material affects the cycle performance of the lithium-ion battery. The preparation method in Embodiments 38 to 41 is basically identical to the preparation method in Embodiment 3 except the parameter values shown in Table 2.

TABLE 2

| | Median particle diameter (μm) | Cycle performance: Capacity retention rate | Cycle performance: Thickness expansion rate |
|---|---|---|---|
| Embodiment 3 | 12 | 82.1% | 12.5% |
| Embodiment 38 | 8 | 82.8% | 12.2% |
| Embodiment 39 | 15 | 82.3% | 12.3% |
| Embodiment 40 | 20 | 82.0% | 12.5% |
| Embodiment 41 | 25 | 78.1% | 12.9% |

As shown in Table 2, when the median particle diameter of the negative active material in the negative active material layer is 5 μm to 20 μm, the cycle capacity retention rate of the lithium-ion battery is further improved, and the thickness expansion rate is further reduced.

References to "some embodiments", "part of embodiments", "an embodiment", "another example", "example", "specific example" or "some examples" throughout the specification mean that at least one embodiment or example in this application includes specific features, structures, materials, or characteristics described in the mentioned embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example (s) in this application. In addition, specific features, structures, materials, or characteristics herein may be combined in one or more embodiments or examples in any appropriate manner.

Although illustrative embodiments have been demonstrated and described above, a person skilled in the art understands that the foregoing embodiments are never to be construed as a limitation on this application, and changes, replacements, and modifications may be made to the embodiments without departing from the spirit, principles, and scope of this application.

What is claimed is:

1. An electrochemical device, comprising a negative electrode and an electrolytic solution; wherein the negative electrode comprises a negative current collector and a negative active material layer disposed on at least one surface of the negative current collector, the negative active material layer comprises a first region and a second region, and a thickness D1 of any position of the first region is less than an average thickness D2 of the second region; and the electrolytic solution comprises a salt containing a P—O bond, and a content of the salt containing a P—O bond is less than or equal to 0.05 gram per 1 $cm^2$ of the first region.

2. The electrochemical device according to claim 1, wherein $D1 \leq D2 \times 97\%$.

3. The electrochemical device according to claim 1, wherein the salt containing P—O bond comprises at least one selected from the group consisting of $LiPO_2F_2$, $NaPO_2F_2$, $KPO_2F_2$, $CsPO_2F_2$, lithium difluorobisoxalate phosphate, and lithium tetrafluorooxalate phosphate.

4. The electrochemical device according to claim 1, wherein the electrolytic solution further comprises a first additive; and the first additive comprises at least one selected from the group consisting of 1,3-propane sultone, fluoroethylene carbonate, vinylene carbonate, succinic anhydride, and maleic anhydride.

5. The electrochemical device according to claim 4, wherein a content of the first additive is 0.001 to 0.2 gram per 1 $cm^2$ of the first region.

6. The electrochemical device according to claim 1, wherein the electrolytic solution further comprises a second additive; the second additive comprises at least one selected from the group consisting of lithium tetrafluoroborate, lithium bis(fluorosulfonyl)imide, lithium bis(trifluoromethylsulfonyl)imide, lithium 4,5-dicyano-2-(trifluoromethyl) imidazole, lithium difluoro(oxalato)borate, lithium bis(oxalato)borate, adiponitrile, succinonitrile, 1,3,6-hexanetricarbonitrile, 1,2,3-tris(2-cyanooxy)propane, 1,4-dicyano-2-butene, glutaronitrile, and tris(2-cyanoethyl) phosphine;

based on a weight of the electrolytic solution, a content of the second additive is in a range of 0.1 wt % to 10 wt %.

7. The electrochemical device according to claim 1, wherein the first region is located at an edge of the negative active material layer, and a width of the first region is less than or equal to 15 μm.

8. The electrochemical device according to claim 1, wherein an area of the first region is less than or equal to 20% of a total area of the negative active material layer.

9. The electrochemical device according to claim 1, wherein the negative active material layer comprises a negative active material, and a median particle diameter of the negative active material is 5 μm to 20 μm.

10. The electrochemical device according to claim 7, wherein the negative active material layer comprises a negative active material, and a median particle diameter of the negative active material is 5 μm to 20 μm.

11. An electronic device, comprising an electrochemical device, the electrochemical device comprises a negative electrode and an electrolytic solution; wherein the negative electrode comprises a negative current collector and a negative active material layer disposed on at least one surface of the negative current collector, the negative active material layer comprises a first region and a second region, and a thickness D1 of any position of the first region is less than an average thickness D2 of the second region; and the electrolytic solution comprises a salt containing a P—O bond, and a content of the salt containing a P—O bond is less than or equal to 0.05 gram per 1 $cm^2$ of the first region.

12. The electronic device according to claim 11, wherein $D1 \leq D2 \times 97\%$.

13. The electronic device according to claim 11, wherein the salt containing P—O bond comprises at least one selected from the group consisting of $LiPO_2F_2$, $NaPO_2F_2$, $KPO_2F_2$, $CsPO_2F_2$, lithium difluorobisoxalate phosphate, and lithium tetrafluorooxalate phosphate.

14. The electronic device according to claim 11, wherein the electrolytic solution further comprises a first additive; and the first additive comprises at least one selected from the group consisting of 1,3-propane sultone, fluoroethylene carbonate, vinylene carbonate, succinic anhydride, and maleic anhydride.

15. The electronic device according to claim 14, wherein a content of the first additive is 0.001 to 0.2 gram per 1 $cm^2$ of the first region.

16. The electronic device according to claim 11, wherein the electrolytic solution further comprises a second additive; the second additive comprises at least one selected from the group consisting of lithium tetrafluoroborate, lithium bis(fluorosulfonyl)imide, lithium bis(trifluoromethylsulfonyl)imide, lithium 4,5-dicyano-2-(trifluoromethyl)imidazole, lithium difluoro(oxalato)borate, lithium bis(oxalato)borate, adiponitrile, succinonitrile, 1,3,6-hexanetricarbonitrile, 1,2,3-tris(2-cyanooxy)propane, 1,4-dicyano-2-butene, glutaronitrile, and tris(2-cyanoethyl)phosphine;

based on a weight of the electrolytic solution, a content of the second additive is in a range of 0.1 wt % to 10 wt %.

17. The electronic device according to claim 11, wherein the first region is located at an edge of the negative active material layer, and a width of the first region is less than or equal to 15 μm.

18. The electronic device according to claim 11, wherein an area of the first region is less than or equal to 20% of a total area of the negative active material layer.

19. The electronic device according to claim 11, wherein the negative active material layer comprises a negative active material, and a median particle diameter of the negative active material is 5 μm to 20 μm.

20. The electronic device according to claim 17, wherein the negative active material layer comprises a negative active material, and a median particle diameter of the negative active material is 5 μm to 20 μm.

* * * * *